United States Patent [19]

Tamaru et al.

[11] Patent Number: 4,694,448
[45] Date of Patent: Sep. 15, 1987

[54] DISC CASE

[75] Inventors: Takuya Tamaru; Mikio Ogusu, Hamamatsu, both of Japan

[73] Assignee: Nippon Gakki Seizo Kabushiki Kaisha, Hamamatsu, Japan

[21] Appl. No.: 731,909

[22] Filed: May 8, 1985

[30] Foreign Application Priority Data

| May 15, 1984 | [JP] | Japan | 59-070479 |
| Jun. 1, 1984 | [JP] | Japan | 59-081526 |
| Jun. 1, 1984 | [JP] | Japan | 59-081527 |

[51] Int. Cl.$^4$ .................. G11B 17/24; G11B 23/04; B65D 85/54
[52] U.S. Cl. .................. 369/291; 206/309; 206/312; 360/133; 369/77.2
[58] Field of Search .................. 369/77.1, 77.2, 291, 369/194; 206/309, 312, 444; 360/133

[56] References Cited

U.S. PATENT DOCUMENTS

| 3,730,602 | 5/1973 | Campbell et al. | 206/309 |
| 4,477,894 | 10/1984 | Clurman | 369/291 |
| 4,507,769 | 3/1985 | Fukumitsu et al. | 369/77.2 |
| 4,509,158 | 4/1985 | Kang | 369/77.2 |
| 4,511,944 | 4/1985 | Saito | 206/444 |
| 4,519,500 | 5/1985 | Perchak | 206/312 |
| 4,520,470 | 5/1985 | d'Alayer | 360/133 |
| 4,525,758 | 6/1985 | Nakagawa et al. | 206/309 |
| 4,627,037 | 12/1986 | Tamaru et al. | 369/291 |
| 4,628,388 | 12/1986 | Kawabe | 360/133 |

FOREIGN PATENT DOCUMENTS 57-210486 12/1982 Japan .

Primary Examiner—Steven L. Stephan
Attorney, Agent, or Firm—Cushman, Darby & Cushman

[57] ABSTRACT

A disc case is constructed for receiving a disc on which information data are recorded and for supporting the disc rotatably in the disc case. The disc case can be set into a reproducing apparatus with the disc received in the disc case. The disc case receives the disc releasably. When set into the reproducing apparatus, while the disc case is fixed in position within the reproducing apparatus, the disc is driven in rotation and thus the information data are reproduced by the reproducing apparatus. The disc case comprises a disc case carrying mechanism for carrying the disc case in cooperation with the reproducing apparatus so as to be loaded or unloaded to the reproducing apparatus.

11 Claims, 24 Drawing Figures

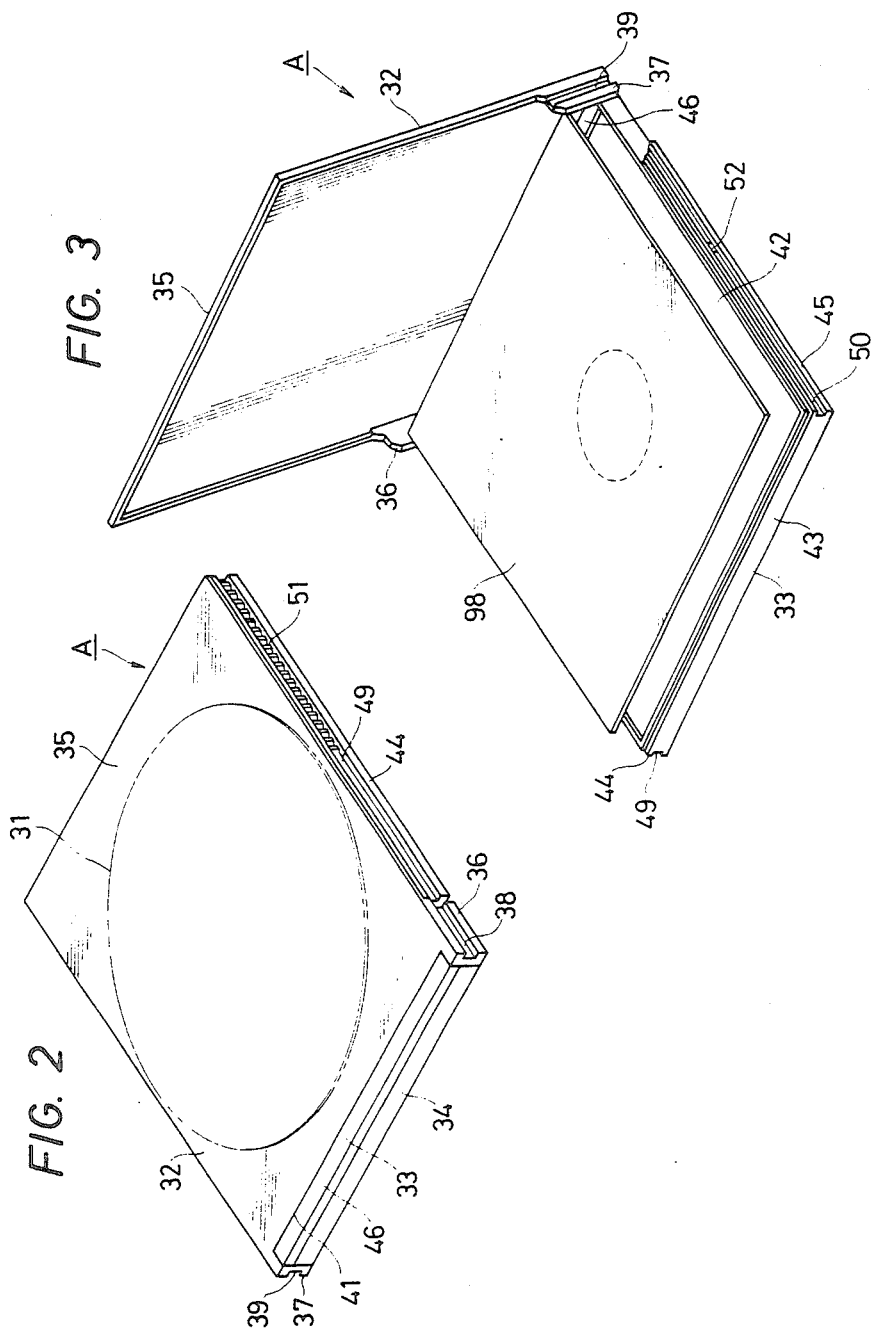

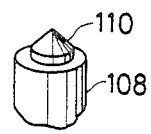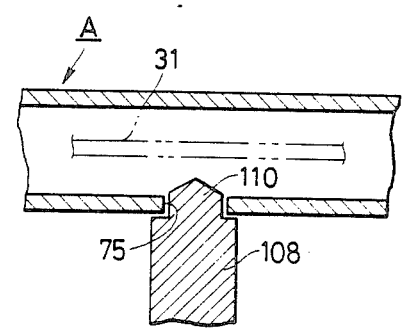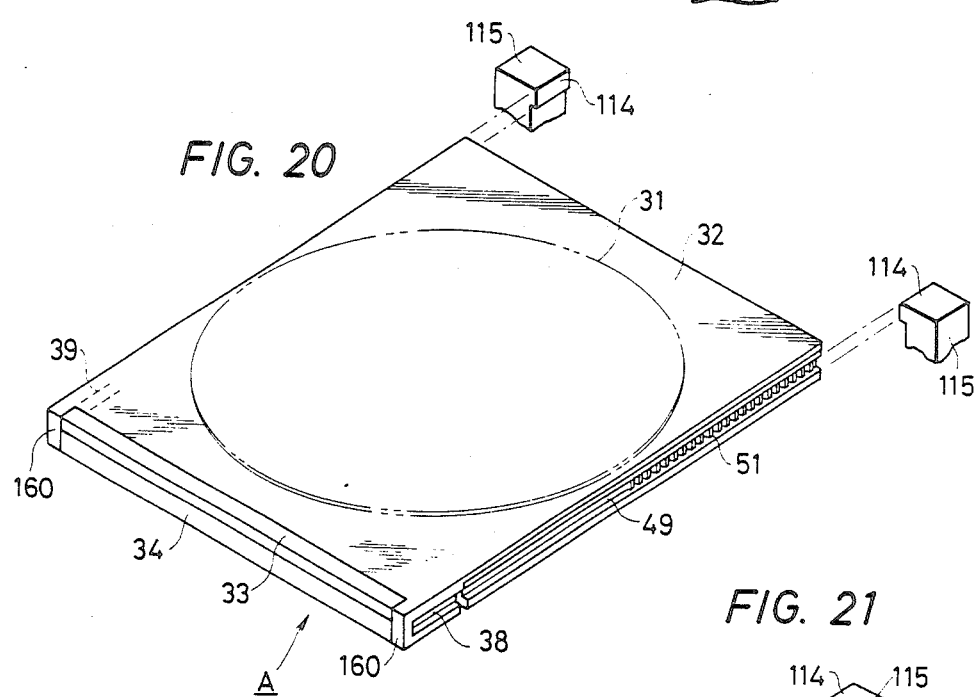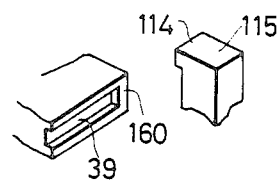

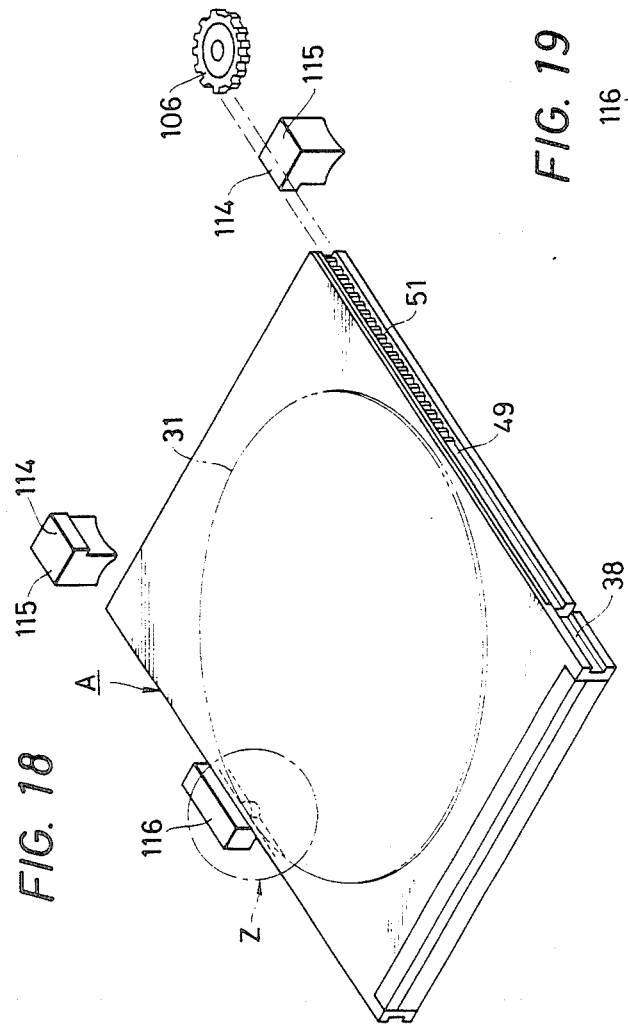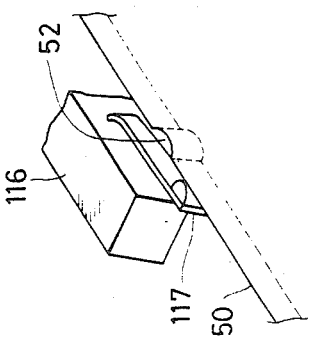

DISC CASE

BACKGROUND OF THE INVENTION (a) Field of the Invention

This invention relates to a disc case for receiving a disc on which information data are recorded and for supporting the disc rotatably in the disc case, the disc case being able to be set into a reproducing apparatus with the disc received in the disc case.

(b) Description of the Prior Art

There is known a disc case to preserve such disc as a compact disc of the Compact Disc digital audio system or optical video disc, etc. Such case is to be used after all to preserve a disc and not to be set into a reproducing apparatus together with the disc to be reproduced. Such disc as mentioned above has been handled as naked with a human hand when the apparatus is to be loaded with the disc, there have been disadvantages that a finger print will be deposited on the surface of the disc, an external force will be applied directly to the disc when striked with the apparatus or the like and the disc set in the apparatus will be exposed to a high temperature by the heat generation of the apparatus.

There is also such conventional disc case as a case for floppy discs used in relation to various office automation equipments, etc. The floppy disc is enclosed within the case, and the equipment is to be loaded with the disc together with the case when the disc is to be reproduced. Therefore, the disc can be protected such as by preventing a finger print from being deposited. However, there has been a defect that, as the case is so formed that the disc can not be taken out of the case, the disc can never be replaced. Further, there has been a defect that, as it is a prerequisite to provide all such formation as, for example, a disc case positioning means on the equipment side in forming an automatic loading mechanism, such mechanism on the equipment side will be much complicated.

Further, there is known, among various floppy cases, such a case wherein a magnetic head inserting hole is closed with a shutter plate in the normal state (when the disc case is not set into the equipment) so as to protect the disc by preventing dust from entering the case through this hole. FIG. 1 is a plan view showing an example (a case for a 3-inch compact floppy disc) of such disc case. In the disc case shown in this drawing, in a space formed within the case 1, a disc 2 is enclosed so as not to be able to be taken out and a shutter plate 5 rotatable about a shaft part 3 arranged in the central part and free to open and close the magnetic head inserting hole 4 is arranged in the case 1, a release 7, which is movable in the directions indicated by the arrows C and D along the guide groove 6 formed through the upper and lower sides of the case 1, is fixed at one end to the shutter plate 5 and at the other end to an operating piece 8, and further in the case 1 provided a spring 9 biasing the shutter plate 5 in the direction indicated by the arrow E via the release 7 so that the shutter plate 5 may close the hole 4. In this case 1, in the normal state, the shutter 5 will close the hole 4 but, when the case is set into the equipment, the operating piece 8 will move to the 2-dotted chain line position, thereby the release 7 will move in the direction indicated by the arrow D and the shutter plate 5 will rotate in the direction indicated by the arrow F to open the hole 4.

Now, in the above mentioned disc case 1, such internal parts as the shutter plate 5, release 7 and spring 9, etc. are all secured in predetermined respective positions by the case 1 itself and therefore, if the disc 2 within is to be replaced, that is, if the case 1 is so constructed as to be able to be opened, these internal parts will all slip down or remove and will become never useful. This shows that the construction of such disc case is never considered so as to open the case, that is to say, to replace the disc. Therefore, there are defects that such disc case can not be adopted as a case required to replace the disc, for example, as a case applicable to a compact disc or the like with which the apparatus has been loaded as naked so far and that the construction of opening and closing the shutter plate 5 in the above mentioned case uses the release 7 or the like and is therefore complicated in the construction and assembly.

SUMMARY OF THE INVENTION

An object of the present invention is to provide a disc case which can replaceably receive a disc and be set into a reproducing apparatus with the received disc to reproduce the disc so that the protection of the disc may be confirmally achieved and the handling of the disc may be simplified.

Another object of the present invention is to provide a disc case which can simplify the construction of the automatic disc loading mechanism on the reproducing apparatus side.

A further object of the present invention is to provide a disc case which can be set into the reproducing apparatus together with the received disc exactly in a predetermined position.

Yet another object of the present invention is to provide a disc case wherein a shutter for opening and closing an aperture through which the reproducing head of the reproducing apparatus accesses the part of the information data recorded on the disc is provided, and wherein a mechanism for opening and closing the shutter can be simply constructed.

These objects are achived by that, when set into the reproducing apparatus, while the disc case is fixed in position within the reproducing apparatus, the disc is driven in rotation and the information data are reproduced by the reproducing apparatus, and that the disc case comprises a disc case carrying mechanism for carrying the disc case in cooperation with the reproducing apparatus so as to be loaded or unloaded to the reproducing apparatus.

According to this invention, the disc can be handled always as received within the disc case so as be protected from a finger print, external force and dust and to be easy to handle. Further, the disc is received replaceably within the disc case and therefore the disc case can be used also for such disc as a compact disc so far used as a part of an automatic disc loading mechanism is also formed on the disc case so that the construction of the automatic disc loading mechanism on the reproducing apparatus side may be very simple. In such case, if a guide groove for carrying the disc case is formed on the disc case and a rack of the automatic disc loading mechanism is formed on the bottom surface of this guide groove, the rack will not directly contact the reproducing apparatus or the like and will be able to be protected from being damaged. Further, if the disc case is provided with a detection part for detecting that the disc case is positioned in a predetermined position in the reproducing apparatus, the disc case will be able to be set exactly in the predetermined position with the simple construction. If the shutter plate is provided on the disc case so that, when the disc case is taken out of the reproducing apparatus, the aperture can be closed by the shutter plate, dust will be prevented from entering the case and the shutter plate opening and closing mechanism will be able to be simply constructed.

These and other objects of the present invention will become more apparent during the course of the follwing detailed description and appended claims.

BRIEF DESCRIPTION OF THE DRAWINGS

FIG. 2 is a perspective view of an embodiment of a disc case according to the present invention;

FIG. 3 is a perspective view of the disc case of FIG. 2 as the upper case and middle case are opened;

FIG. 16 is an enlarged perspective view of an important part of a location pin;

FIG. 17 is an enlarged sectional view showing the engaged relation of the disc case and location pin;

FIG. 18 is a view showing the relative positions of the disc case, guide member, pinion and microswitch;

FIG. 19 is a detailed view of the part indicated by the arrow Z in FIG. 18;

FIG. 20 is a perspective view showing another embodiment of a disc case according to the present invention;

FIG. 21 is a partial enlarged perspective view showing the function of the disc case of FIG. 20;

DESCRIPTION OF THE PREFERRED EMBODIMENTS

The present invention shall be explained on the embodiments applied to the case of a compact disc of the Compact Disc digital audio system with reference to the drawings in the following:

FIGS. 2 to 11 are views showing the construction of the first embodiment of a disc case A according to the present invnetion and FIGS. 12 to 16 are views showing an example of an reproducing apparatus (compact disc player) for reproducing a disc received in the disc case A.

First of all, the disc case A shown in FIGS. 2 to 11 is so constructed as to be able to receive a disc (compact disc) 31 replaceably and reproduceably and has as main components an upper case 32, middle case 33 and lower case 34 made of a transparent synthetic resin.

Figure 1:
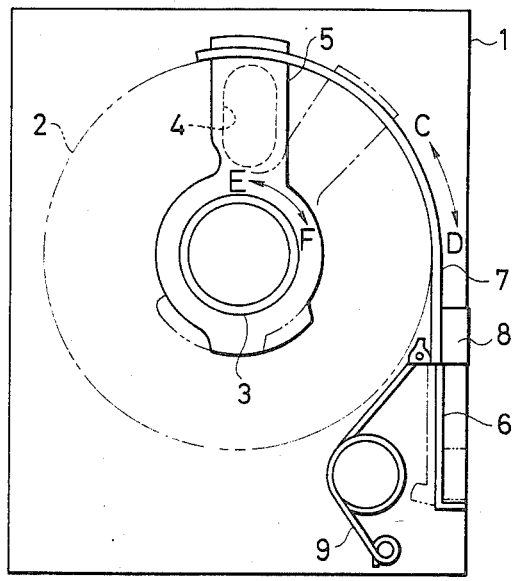
FIG. 1 is a plan view showing an example of a conventional disc case.
Figure 6:
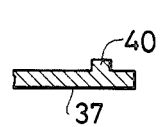
FIG. 6 is a sectional view along line VI—VI in FIG. 5.

The upper case 32 has side walls 36 and 37 formed respectively on both left and right sides of the rear end of a rectangular top plate 35, guide grooves 38 and 39 formed respectively on the surfaces of these side walls 36 and 37, a shaft 40 formed on the inner surface as shown in FIG. 6 and a cut part 41 formed in the rear end portion of the top plate 35.

Figure 7:
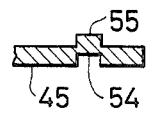
FIG. 7 is a sectional view along line VII—VII in FIG. 5.

The middle case 33 has a front wall 43 and side walls 44 and 45 formed respectively in the front end portion and both left and right sides of a rectangular plate 42 so as to project vertically from the plate 42 and a rear wall 46 formed in the rear end portion of the plate 42. Here, a hole 47 is formed in the central portion of the plate 42 and a thrust receiving plate fixing hole 48 is formed around this hole 47. Guide grooves 49 and 50 are formed respectively on the surfaces of the side walls 44 and 45. A rack 51 is formed on the front half part of the bottom surface of the guide groove 49. A recess 52 is formed on a predetermined portion of the bottom surface of the guide groove 50. A cut part 53 is formed in the middle portion of the lower end of the side wall 44. The rear end portions of the side walls 44 and 45 are cut on the surface sides so as to be formed to be thin. In the rear end portion of each of these thin portions, as shown in FIG. 7, a hole 54 is formed on the outer surface side and a shaft 55 is formed on the inner surface side.

Figure 4:
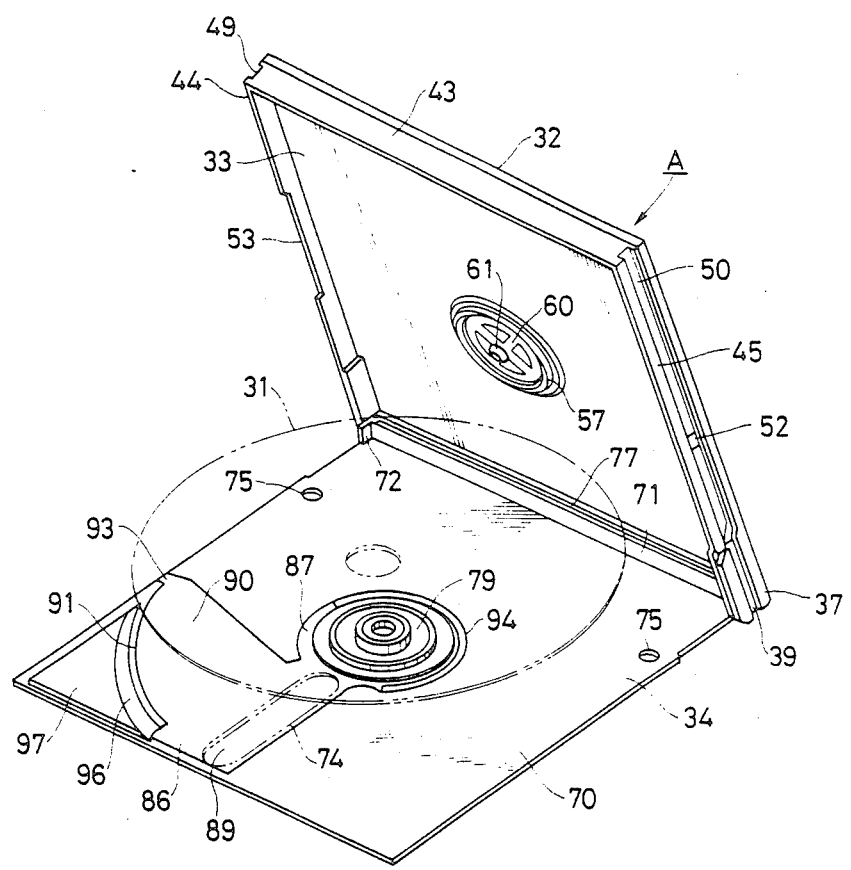
FIG. 4 is a perspective view of the disc case of FIG. 2 as the middle case and lower case are opened.
Figure 5:
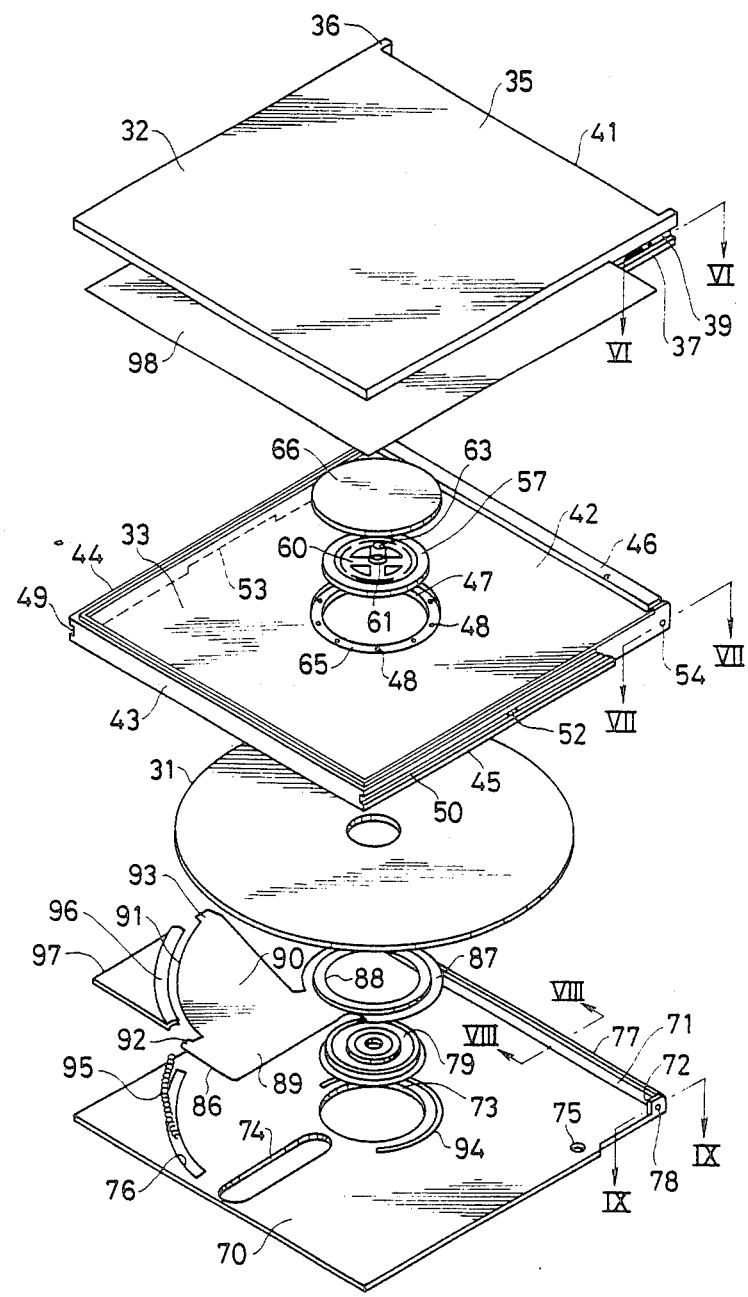
FIG. 5 is an exploded perspective view of the disc case of FIG. 2.
Figure 10:
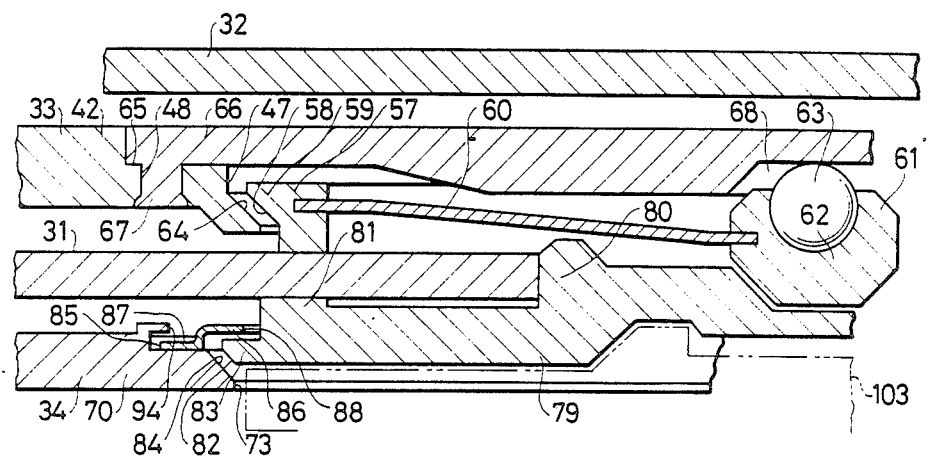
FIG. 10 is an enlarged sectional view of a disc supporting part in the disc case in FIG. 2.

As shown in FIGS. 4, 5 and 10, a clamper 57 is arranged within the hole 47, is an annulus having a projection 59 which has a tapered surface 58 on the lower surface and is fixed with a thrust spring 60 made of spring steel on the inner surface side. A ball supporting member 61 is fixed in the center of the thrust spring 60, and a steel ball 63 is fitted in a substantially hemispherical recess 62 formed in this supporting member 61. Such clamper 57, thrust spring 60 and ball supporting member 61 are integrally formed by injection molding. The clamper 57 and the respective members fixed to it are arranged with the above mentioned tapered surface 58 engaged the tapered surface 64 formed within the hole 47 so as to be inhibited to drop down. The portion, in which the thrust receiving plate fixing hole 48 is formed, of the middle case 33 is a circular recess 65 within which a disc-shaped thrust receiving plate 66 is fitted. A projection 67 formed on the lower surface of the thrust receiving plate 66 is inserted in the fixing hole 48 and is welded to the middle case 33 side. By this construction, the clamper 57 and the members fixed to it can not be pulled out upwardly but are rotatable with the steel ball 63 in contact with the bottom surface of a recess 68 formed on the lower surface of the thrust receiving plate 66 as a center.

Figure 8:
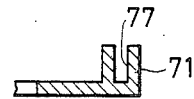
FIG. 8 is is a sectional view along line VIII—VIII in FIG. 5.
Figure 9:
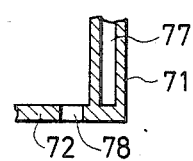
FIG. 9 is a sectional view along line IX—IX in FIG. 5.

The lower case 34 has a rear wall 71 formed in the rear end of a rectangular bottom plate 70 and has connecting walls 72 formed in the right and left ends of this rear wall 71. Here, the bottom plate 70 has a turntable inserting hole 73 formed in its central portion a laser beam introducing hole 74 formed in its front portion, right and left engaging holes 75 for positioning formed in its rear portion and further an arcuate groove 76 formed on the upper surface of its front portion. Further, a back-title note inserting groove 77 opening upward as shown in FIG. 8 is formed in the rear wall 71 and a hole 78, as is shown in FIG. 9, is formed in the connecting wall 72.

A sub-turntable 79 is arranged in a turntable inserting hole 73 in the bottom plate 70, is a disc-shaped member holding the disc 31 in cooperation with the above mentioned clamper 57, and has a disc mounting wall 80 formed on the central part of the upper surface, a disc holding wall 81 projecting upward formed on the upper surface of the outer peripheral portion and an engaging wall 83 which has a tapered surface 82 on the side formed in the lower portion of the outer peripheral part. This sub-turntable 79 is to be engaged with the tapered surface 84 within the inserting hole 73 formed in the bottom plate 70 so as not to be pulled out downwardly. A circular recess 85 is formed on the periphery of the inserting hole 73 of the upper surface of the bottom plate 70. A shutter plate 86 is inserted with its flange 87 into this recess 85 and is shown in detail in FIGS. 4, 5, 10 and 11. The shutter plate 86 opens and closes the laser beam introducing hole 74, prevents the sub-turntable 79 from being pulled out upwardly, and has a shutter part 89 extending radially outward on the outer peripheral portion of the flange 87 expanding slightly upwardly on the center hole 88 side, a side plate part 90 extending horizontally from the shutter part 89 which has an arc edge 91 formed to be concentric with the center hole 88, a hook 92 formed at the outside end of the shutter part 89, and an engaging part 93 formed at the outside end of the side plate part 90. This shutter plate 86 is arranged with its shutter part 89 positioned in the laser beam introducing hole 74 and with its flange 87 positioned within the recess 85. A flange member 94 to prevent the flange 87 from being pulled out of the recess 85 is fixed to the upper surface of the bottom plate 70.

Figure 11:
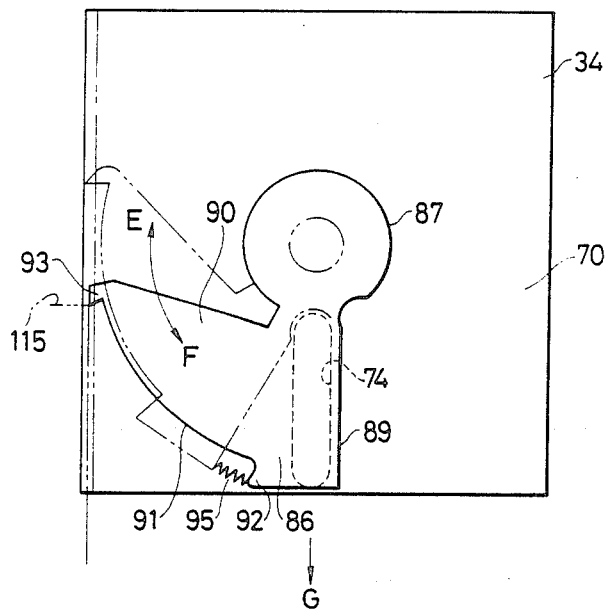
FIG. 11 is a view explaining an operation of a shutter plate in the disc case in FIG. 2.

On the other hand, a shutter spring 95 which is secured at one end to the one end of the groove 76 and at the other end to the securing hook 92 of the shutter plate 86 is arranged within the groove 76 of the bottom plate 70, and is so held as to be flexible only within the groove 76 by a retaining member 97 having a spring retaining part 96 fixed to the bottom plate 70. In this construction, the shutter plate 86 will be rotatable in the directions indicated by the arrows E and F in FIG. 11 with the flange 87 held within the recess 85 as a center and will be normally biased by the shutter spring 95 so that the shutter part 89 will close the laser beam introducing hole 74. The engaging part 93 is positioned as projected slightly outward from the side edge of the bottom plate 70 as shown in FIG. 11. Further, the sub-turntable 79 can move slightly vertically within the inserting hole 73 but is prevented by the flange 87 held within the recess 85 from being pulled out upwardly.

The upper case 32, middle case 33 and lower case 34 respectively constructed as mentioned above and fitted with the above mentioned members connected with each other in such way that they are positioned as shown in FIG. 5 with the respective cases arranged on the front, rear, right and left and that the upper case 32 is engaged in the right and left shafts 40 with the right and left holes 54 in the middle case 33 and that the middle case 33 is engaged in the right and left shafts 55 with the right and left holes 78 in the lower case 34. The thus connected respective cases 32, 33 and 34 can be opened and closed as shown in FIGS. 2 to 4 with the shafts 40 and 55 as respective centers. When the cases 32, 33 and 34 are closed, the recesses and projections (not illustrated) formed in the respective cases will be engaged with each other so as not to be accidentally opened. Here, if the upper case 32 and middle case 33 are closed, a slight space will be defined between the top plate 35 and plate 42 and will be utilized as a space in which a liner note 98 or the like showing in detail the recorded contents of the disc 31 will be inserted. In this time, the guide grooves 38 and 39 of the upper case 32 will be aligned respectively with the guide grooves 49 and 50 of the middle case 33 and the rear wall 46 of the middle case 33 will be positioned within the cut part 41 of the upper case 32. The back-title inserting groove 77 formed in the rear wall 71 of the lower case 34 will be used to receive a back-title note or the like showing the main contents of the disc 31 and will be closed by the rear wall 46 when the middle case 33 and lower case 34 are closed. The space between the middle case 33 and lower case 34 is a space for receiving the disc 31. When the cases 33 and 34 are closed, the engaging part 93 of the shutter plate 86 will project out of the cut part 53 of the middle case 33.

The method of using the disc case A constructed as mentioned above shall be explained. First of all, the back-title note (not illustrated) and liner note 98 corresponding to the contents of the disc 31 are prepared. The middle case 33 and lower case 34 are opened, then the back-title note is inserted into the inserting groove 77, and the upper case 32 and middle case 33 are opened, then the liner note 98 is inserted between them. As the above mentioned respective cases are formed of a transparent material, when they are closed, the contents of the back-title note and liner note 98 will be visible outside the case. In receiving the disc 31 in the case, while the upper case 32 and middle case 33 are closed to each other, the middle case 33 and lower case 34 are expanded from each other and the disc 31 is mounted to the sub-turntable 79 by relatively advancing the mounting wall 80 of the sub-turntable 79 into the center hole of the disc 31. Then the middle case 33 and lower case 34 are closed. In this state, the disc 31 will be held between the holding wall 81 of the sub-turntable 79 and clamper 57 as mounted to the mounting wall 80 of the sub-turntable 79 as shown in FIG. 10. FIG. 10 shows that the disc case A is set into the reproducing apparatus and the sub-turntable 79 is pushed upwardly. When the disc case A is not set into the reproducing apparatus, the disc 31, clamper 57 and sub-turntable 79 will be positioned below the positions shown in the drawing. That is to say, the clamper 57 is biased downwardly by the force of the thrust spring 60 to press the disc 31 toward the sub-turntable 79 side. Therefore, the sub turntable 79 will contact on the tapered surface 82 with the tapered surface 84 of the lower case 34 and will be positioned to close the inserting hole 73. As a result, the disc 31 will be held between the clamper 57 and sub-turntable 79 by the biasing force of the spring 60 and therefore will not move accidentally within the case. When the sub-turntable 79 is raised upward as shown in FIG. 10, the disc 31, clamper 57 and sub-turntable 79 will be rotatable with the steel ball 63 as a center.

If the disc 31 is received within the disc case A as mentioned above, when the disc 31 is to be handled, the disc can be handled without being directly held by hands and a finger print can be prevented from being deposited on the disc 31. Further, in this disc case A, when the case A is not set into the reproducing apparatus, the inserting hole 73 is closed with the sub-turntable 79, the laser beam introducing hole 74 is closed with the shutter plate 86 and therefore the disc 31 can be covered substantially on the entire outside so that the disc can be positively protected from an external force and dust, etc.

In order to take the disc 31 out of the disc case A, in the order reverse to the above, the middle case 33 and lower case 34 may be opened and the disc 31 may be removed from the sub-turntable 79. Thus, in the disc case A, the disc can be replaced and the replacing operation is very simple. In this time, the parts within the disc case will not be likely to slip down.

In this embodiment, as the three of the clamper 57, thrust spring 60 and ball supporting member 61 are integrally molded by insertion molding, the number of parts can be reduced, the assembly can be facilitated, the manufacture cost can be reduced and the entire case can be formed to be thin.

When the disc case A is set into the reproducing apparatus, though the functions of the respective parts shall be detailed later, the guide grooves 38, 49, 39 and 50 will be utilized as guides to control the carrying direction of the case, the rack 51 will be utilized as a mechanism of carrying the case in cooperation with the pinion on the reproducing apparatus side, the recess 52 will be utilized as a delection part for detecting the position of the disc case in controlling the movement of the disc case, the engaging holes 75 will be utilized to position the disc case relative to the reproducing apparatus to be loaded and the engaging part 93 of the shutter plate 86 will be utilized as an actuator to open and close the laser beam introducing hole 73.

The reproducing apparatus to be loaded with the disc case A to reproduce the disc 31 shall be explained in the following. FIGS. 12 to 19 are views showing the construction of the reproducing apparatus B to be loaded with the disc case A. In FIGS. 12 to 15, the reference numeral 100 represents an outer case of the reproducing apparatus, and a chassis 101 is arranged within this outer case 100, and is fitted with a disc motor 102 having a turntable 103 fixed to a rotary shaft thereof. The turntable 103 is formed to be disc-shaped and engageable with the sub-turntable 79 through the inserting hole 73 of the disc case A so as to transmit a power. A loading motor 104 is mounted to the chassis 101 so that its torque may be transmitted through a driving force transmitting mechanism to a shaft 105 rotatably supported on the chassis 101. A pinion 106 is mounted to the shaft 105 so as to be vertically movable and to be able to transmit a power of the motor 104.

Figure 12:
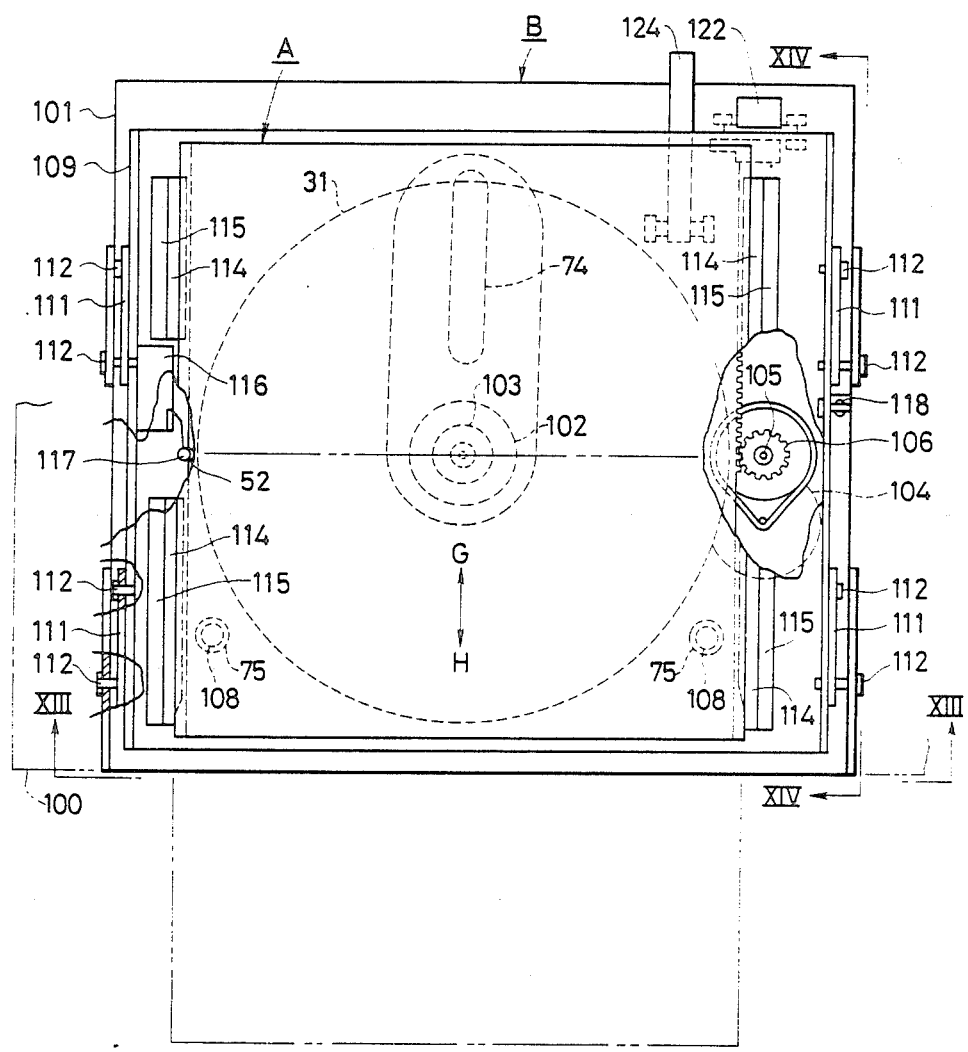
FIG. 12 is a plan view of an important part of a reproducing apparatus, showing as loaded with the disc case of FIG. 2.
Figure 13:
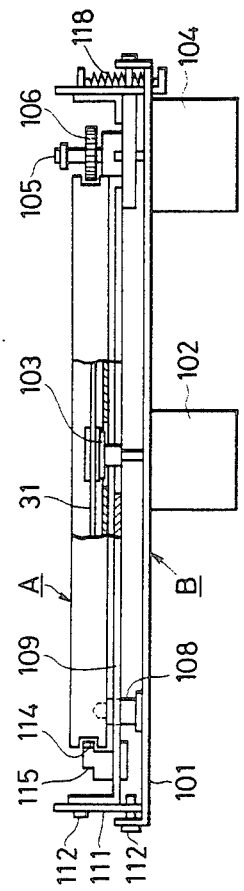
FIG. 13 is an elevation as seen in the direction of line XIII—XIII in FIG. 12.

Further, right and left location pins 108 are fixed to the chassis 101 and a housing 109 is supported on the chassis 101. The location pin 108 in a cylindrical member having an engaging part 110 having a tapered top portion at the upper end as shown in FIG. 16 so that the engaging part 110 may engage with the engaging hole 75 of the disc case A as shown in FIG. 17 to position the disc case A. The housing 109 is supported on the chassis 101 by links 111 and pins 112 so as to be free to contact with and separate from the chassis 101 by rotating the links 111. On the housing 109, holes are formed in the parts in which the turntable 103, pinion 106, location pins 108 and an optical head (not illustrated) mounted to the chassis 101 are located so that the above mentioned respective members may be projected or exposed above the housing 109. Guide members 115 having projections 114 on the right and left are mounted on the upper surface of this housing 109. The projections 114 of the guide members 115 are located within the guide grooves 38, 49, 39 and 50 of the disc case A to guide this disc case A in the directions indicated by the arrows G and H. Further, a microswitch 116 is mounted to the upper surface of the housing 109 as shown in FIGS. 12, 18 and 19. The microswitch 116 is to be switched when an actuator 117 is contacted with the above mentioned guide groove 50 of the disc case A and when an actuator 117 is engaged with the recess 52 to control turning on and off of the loading motor 104. The housing 109 is biased downwardly by a clamp spring 118 tensed between the chassis 101 and the housing 109.

A lock plate 122 rotatable with a pin 120 as a center and biased in the direction indicated by the arrow I by a lock spring 121 is provided in the rear end portion of the chassis 101. The lock plate 122 to lock the housing 109 in position by engaging the rear end edge of the housing with the engaging recess 123 when the housing 109 moves upwardly. An ejecting lever 124 operated by a driving mechanism not illustrated to raise the housing 109 is provided in the rear end portion of the chassis 101.

In this reproducing apparatus B, instructions of various operation are to be made by manipulating operating buttons not illustrated.

Figure 15:
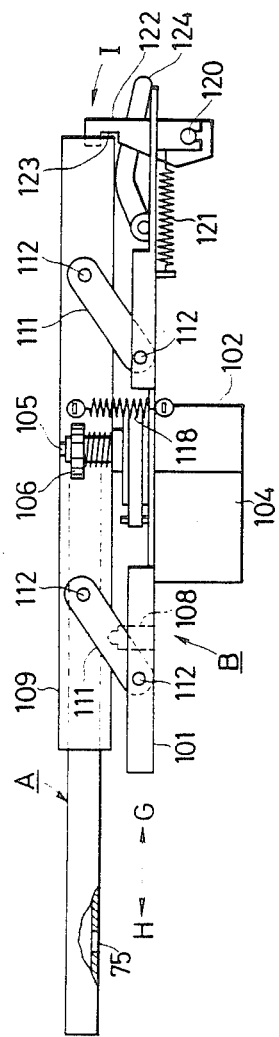
FIG. 15 is the same side view as in FIG. 14, showing the housing in the raised position.

In order to reproduce the disc by the reproducing apparatus B, first of all, the disc case A containing the disc 31 as described above is inserted to the position indicated by the two-dotted chain lines in FIG. 12, that is, the position in which the bottom surface of the guide groove 50 contacts the actuator 117 and the end portion of the rack 51 contacts the pinion 106. In the apparatus B, at first, the housing 109 is in the raised position as shown in FIG. 15 and the lock plate 122 is engaged with this housing 109. In inserting the disc case A, the projection 114 of the guide member 115 is positioned within the guide grooves 38, 49, 39 and 50 to guide the disc case A in the direction indicated by the arrow G. When the actuator 117 contacts the guide groove 50 so as to be displaced, the microswitch 116 will be switched so that the control circuit not illustrated will thereby turn on the loading motor 104. When the motor 104 is turned on, the pinion 106 will be rotated clockwise in FIG. 12 and will be thereby meshed with the rack 51 to further carry the disc case A in the direction indicated by the arrow G. Here, when the disc case A is inserted and moved in the direction indicated by the arrow G with the guide member 115 as a guide, as shown in FIG. 11, the engaging part 93 of the shutter plate 86 will engage with the projection 114 of the guide member 115 so that thereby the shutter plate 86 will be rotated in the direction indicated by the arrow E against the biasing force of the shutter spring 95 and the laser beam introducing hole 74 having been closed by the shutter part 86 will open.

As this opening and closing operations of the shutter plate 86 are made by the direct engagement of the engaging part 93 of the shutter plate 86 and the guide member 115 of the reproducing apparatus side with each other, the construction will be simple and the operation itself will be more positive.

Figure 14:
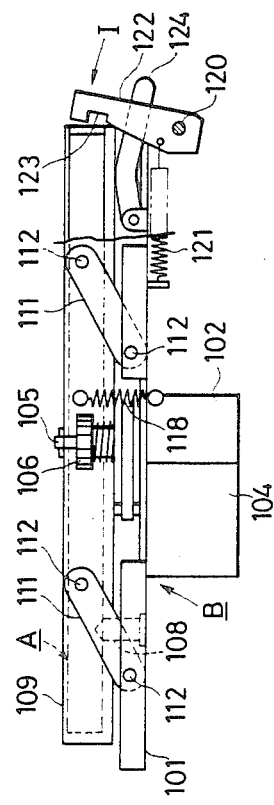
FIG. 14 is a side view as seen in the direction of line XIV—XIV in FIG. 12.

When the disc case A is carried to the position indicated by the solid lines in FIGS. 12 and 14, it will push the lock plate 122 on the upper end portion to disengage the lock plate 122 and housing 109 with each other. On the other hand, at this time, the microswitch 116 will be switched by the engagement of the actuator 117 with the recess 52 of the disc case A so that thereby the control circuit will turn off the loading motor 104, that is to say, at this time, the microswitch 116 will detect that the disc case A has reached the predetermined loading position. When the lock plate 122 disengages with the housing 109, the housing 109 will be moved downwardly by the biasing force of the clamp spring 118. At this time, the turntable 103 will relatively advance into the disc case through the inserting hole 73 of the disc case A and will engage with the lower surface of the sub-turntable 79 as shown in FIG. 10. The right and left location pins 108 will engage with the engaging holes 75 of the disc case A to hold the disc case A in a predetermined position.

Here, if the playing button is operated, the disc motor 102 will be turned on to rotate the turntable 103 and this rotation will be transmitted to the sub-turntable 79 to rotate the disc 31. Here, the optical head will emit a laser beam onto the disc 31 through the laser beam introducing hole 74 of the disc case A from the chassis 101 side and the reflected beam by the disc 31 will be detected to read out the signal recorded on the disc 31. This signal will be reproduced as an audio signal through a reproducing circuit and amplifier, etc. not illustrated.

In order to take out the disc case A after the disc 31 is reproduced, when the ejecting button is operated, the driving mechanism will drive the ejecting lever 124 upwardly to raise the housing 109 and the housing 109 will be engaged with the lock plate 122 by the biasing force of the spring 121 so as to be held in the raised position. At this time, when the control circuit turns on the loading motor 104, the pinion 106 will rotate counterclockwise in FIG. 12 so that thereby the disc case A will be moved in the direction indicated by the arrow H. This movement will stop when the actuator 117 of the microswitch 116 separates from the guide groove 50. If the disc case A is taken out of the reproducing apparatus B, the shutter plate 86 will be biased by the spring 95 and rotate in the direction indicated by the arrow F in FIG. 11 and will close the laser beam introducing hole 74.

Thus the disc case A can be automatically loaded to the reproducing apparatus so the disc 31 received within the disc case A can be reproduced.

FIG. 20 is a view showing another embodiment of the present invention. In this embodiment, in addition to the construction of the above mentioned embodiment, stopper pieces 160 are formed in the end portions of the guide grooves 38 and 39 of the upper case 32. According to this construction, if the disc case is to be inserted into the reproducing apparatus B errorneously from an opposite side, as shown in FIG. 21, the stopper pieces 160 will contact the projections 114 of the guide members 115 to prevent the misinsertion of the disc case.

In the above mentioned embodiments, the engaging holes 75 for the location pins formed on the disc case are formed only in the lower case, but they may be formed through the middle case and upper case. Instead of these engaging holes, projections may be formed on the disc case side and may be engaged with recesses or holes formed on the reproducing apparatus side position the disc case.

In the above mentioned embodiments, the recess 52 as a detection part is provided on the guide groove 50 side but may be provided on the guide groove 49 side or on both sides.

Also in the above mentioned embodiments, a detection part in the form of a recess is provided on the bottom surface of the guide groove but may be provided in any place on the surface of the case and may be not only in the form of a recess but also in any form such as a hole or projection, etc.

Figure 22:
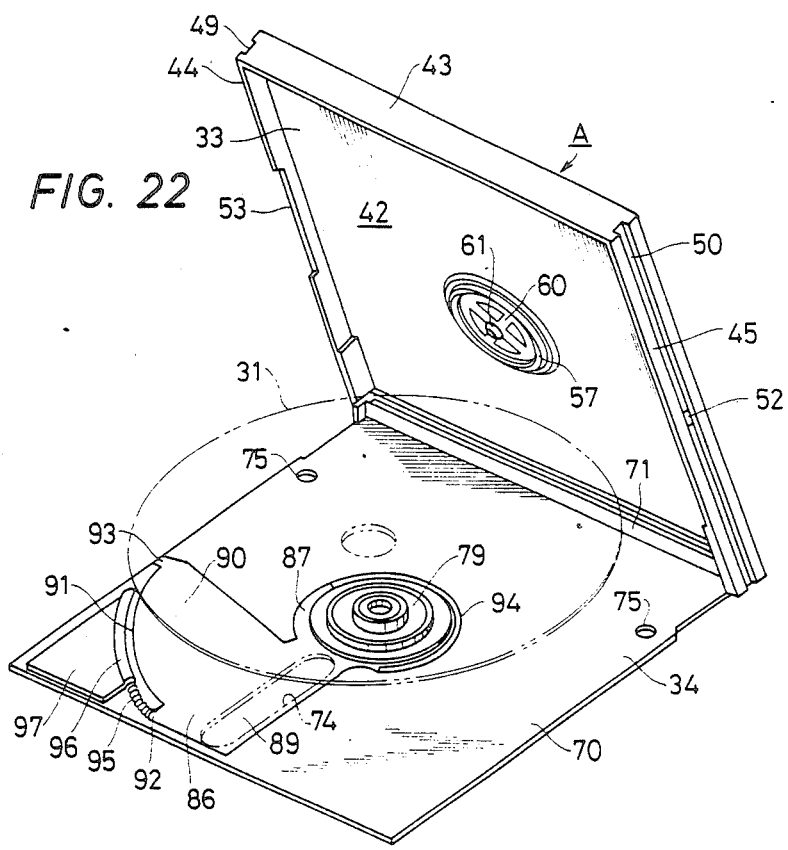
FIG. 22 is further another embodiment of a disc case according to the present invention.
Figure 23:
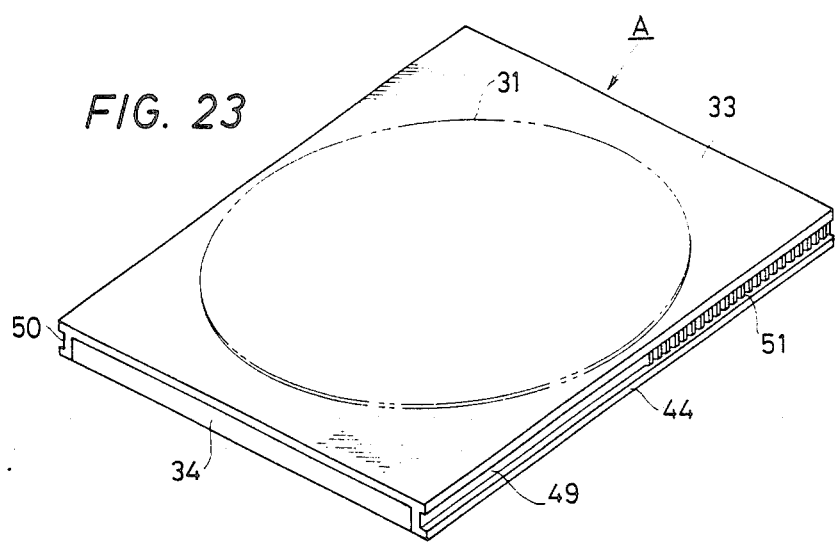
FIG. 23 is a perspective view of the disc case of FIG. 23, shown as closed.
Figure 24:
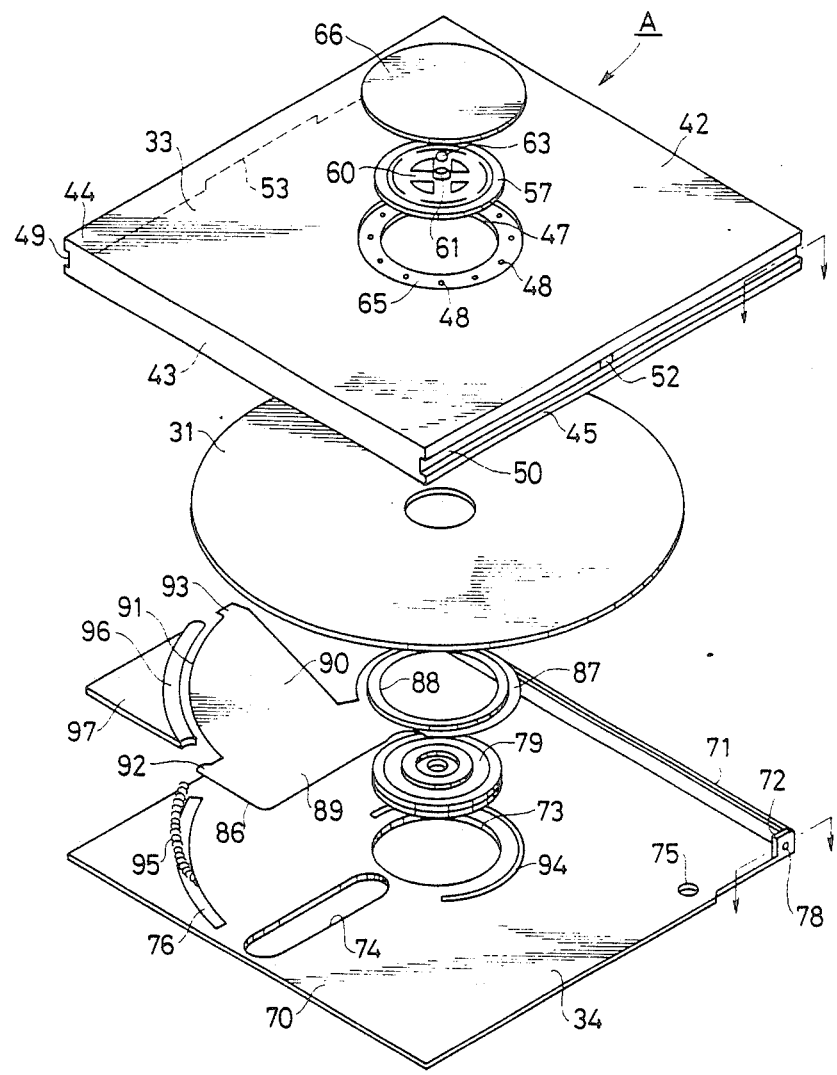
FIG. 24 is an exploded perspective view of the disc case of FIG. 22.

FIGS. 22 to 24 show yet another embodiment of the disc case according to the present invention except the liner note receiving function by omitting the upper cases 32 of the disc case A in the above mentioned embodiments. The operation of this embodiment will be apparent from the explanation with respect to the above mentioned embodiments. In these figures, the same components as in the above mentioned embodiments are designated by the same reference characters.

What is claimed is:

1. A disc case for removably housing a disc on which data has been recorded and for supporting the disc rotatably in said case so that said case can be disposed in reproducing apparatus of the type having means for reproducing the data stored on the disc whereby the reproducing apparatus can reproduce the data while the disc is housed in said case, the case comprising a first plate having sides and depending side walls with one of said side walls having a groove formed therein with said groove having a bottom surface and a rack formed on said bottom surface for cooperating with a loading mechanism of the reproducing apparatus, a second plate having sides one of which is hingedly connected to said first plate along one of the sides thereof so that said plates are movable between open and closed positions.

2. The disc case as claimed in claim 1 for use in combination with a reproducing apparatus, said reproducing apparatus having a loading mechanism including a pinion for cooperation with said rack.

3. The disc case as claimed in claim 2 wherein said reproducing apparatus includes a guide member for cooperation with said groove on said disc case for guiding said disc case during loading and unloading thereof.

4. A disc case according to claim 1, wherein said disc case comprises a detection part which is arranged on said disc case and is adapted to be detected by detecting means arranged on the reproducing apparatus when carrying said disc case so that it is descriminated whether said disc case is in a predetermined position within the reproducing apparatus.

5. A disc case according to claim 4, wherein said detection part is selected from the group consisting of a hole, recess and projection, and is formed on the surface of said disc case.

6. The dics case as claimed in claim 7 wherein said detection part is formed on said bottom surface of said groove.

7. A disc case according to claim 1, further comprising an aperture adapted to provide access for a reproducing head of the reproducing apparatus to the portion of said information data recorded on said disc, and a shutter plate for opening and closing said aperture, which is provided integrally with an engaging part, said engaging part being adapted to cooperate with an actuating member of the reproducing apparatus during the carrying of said disc case by said disc case carrying mechanism, said shutter plate opening said aperture when said disc case is set into the reproducing apparatus and closing said aperture when said disc case is released out of the reproducing apparatus.

8. A disc case according to claim 7, wherein said shutter plate rotates concentrically with said disc to open and close said aperture.

9. A disc case according to claim 1, further comprising a back-title note inserting groove which is formed on one side of said disc case and in which a back-title note is received exchangeably.

10. The disc case as claimed in claim 9 wherein said disc case comprises a third plate hingedly connected to said disc case for opening and closing said back-title note inserting groove.

11. A disc case for removably housing a disc on which data has been recorded and for supporting the disc rotatably in said case so that said case can be disposed in reproducing apparatus of the type having means for reproducing the data sorted on the disc whereby the reproducing apparatus can reproduce the data while the disc is housed in said case, the case comprising a first plate having sides and depending side walls with one of said side walls having a groove formed therein with said groove having a bottom surface and a rack formed on said bottom surface for cooperating with a loading mechanism of the reproducing apparatus, a second plate having sides one of which is hingedly connected to said first plate along one of the sides thereof so that said plates are movable between open and closed positions, said second plate having a central opening and a turntable member movably disposed in said opening so as to be rotatable relative thereto, said first plate having a central portion and a clamper member moutned therein, said clamper member including a central member and a peripheral member and spring means for resiliently urging said peripheral member of said clamper member into engagement with a surface of a disc when said first and second plates are moved to said closed position about a disc, said clamper member being rotatable in said central portion of said first plate with said turntable member when said plates are in said closed position and said turntable member engages a disc and is rotated by the reproducing apparatus.

* * * * *